E. C. HUBBARD.
Screw-Propeller.
No. 211,016. Patented Dec. 17, 1878.
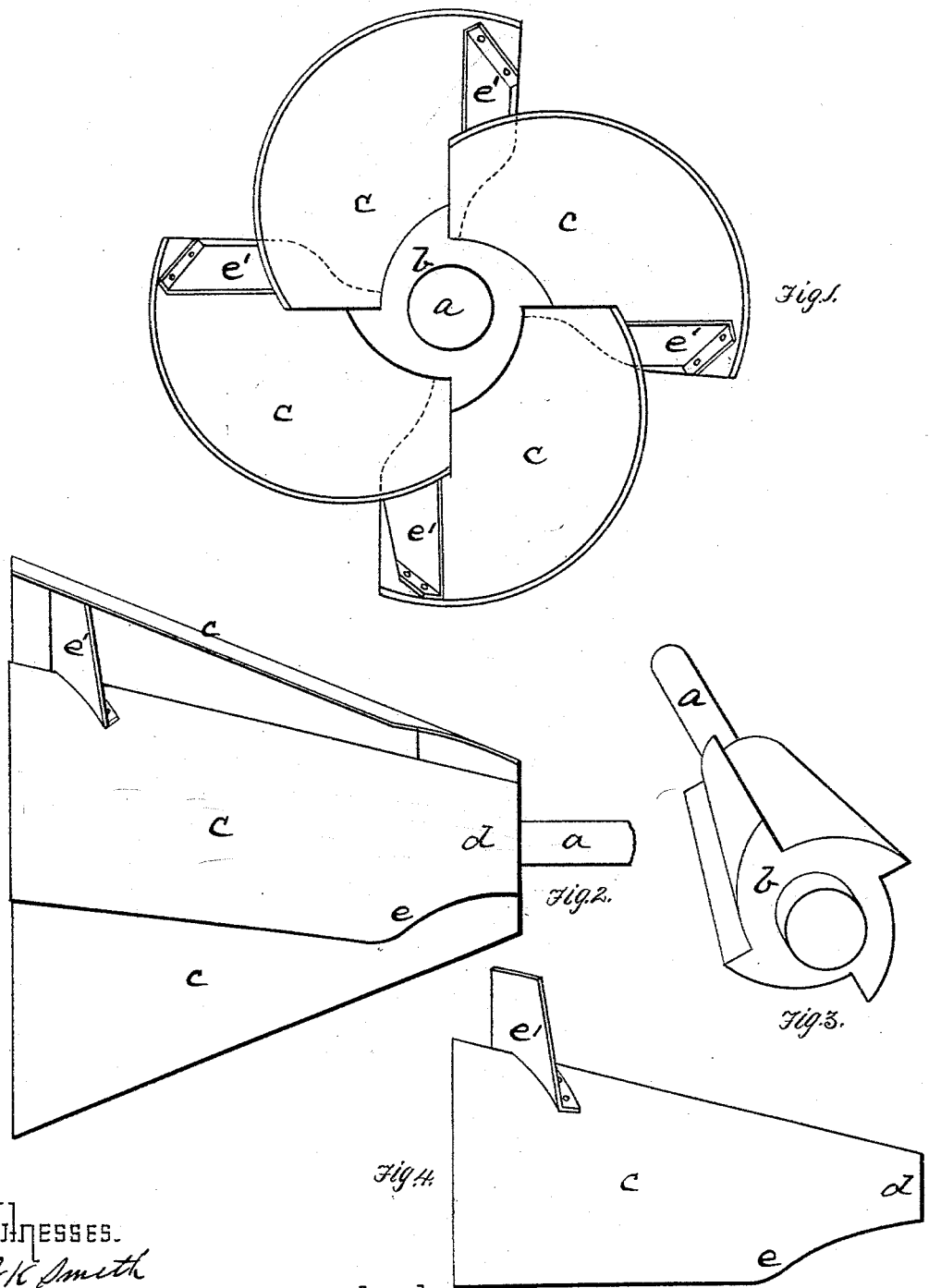

UNITED STATES PATENT OFFICE.

ERWIN C. HUBBARD, OF COLUMBIANA, OHIO, ASSIGNOR TO HIMSELF AND EDWARD A. L. ROBERTS, OF TITUSVILLE, PENNSYLVANIA.

IMPROVEMENT IN SCREW-PROPELLERS.

Specification forming part of Letters Patent No. 211,016, dated December 17, 1878; application filed November 16, 1878.

*To all whom it may concern:*

Be it known that I, ERWIN C. HUBBARD, of Columbiana, State of Ohio, have invented a new and useful Improvement in Propellers for Vessels; and I do hereby declare the following to be a full, clear, and exact description thereof, reference being had to the accompanying drawings, forming part of this specification, in which—

Figure 1 is a rear-end view of devices embodying my invention. Fig. 2 is a side elevation of the same. Fig. 3 is a detached view of the hub. Fig. 4 is a detached view of one of the blades and stays.

Like letters refer to like parts wherever they occur.

My invention relates to certain improvements on propeller-wheels, and is more especially directed to the manner of staying the blades and shaping the same, so that less resistance is met and more power is attained.

In the main, the present invention is an improvement on Letters Patent No. 135,555, granted to me February 4, 1873; and consists, first, in forming each blade with a convexity or lip projecting in advance of the attachment of the blade to the hub; and, secondly, in particular features of construction, hereinafter specified.

I will now proceed to describe my invention, so that others skilled in the art to which it appertains may apply the same.

In the drawings, $a$ indicates a suitable shaft, to the end of which is secured the conical serrated hub $b$, for the attachment of the blades $c$. $c\ c$ indicate the blades, in the present instance four, though any desired number may be used; and they should be so set with relation to each other as to give the wheel sufficient lead. The blades $c$ are narrow at their attachment to the hub $b$, as shown at $d$, and widen out rapidly, as at $e$, so as to form a leading edge or lip, which facilitates the movement of the blade by reducing the resistance in the water. The outer ends of the blades $c$, I stay by a series of supplemental segmental blades, $e'$, which act as braces, and are arranged with relation to the shaft and the blades, so as to correspond to detached segments of a screw-propeller, so that the stays, in addition to bracing the blades, add surface and power to the wheel. The pitch and flare of these plates $e'$ can be varied according to circumstances.

The advantages of my invention are that there is a gain of surface with decrease of resistance, and consequently a gain of power. The interior of the wheel is free from obstruction; consequently the water can be expelled more rapidly and with less loss of power. Finally, the bracing or staying of the blades in the manner specified simplifies the whole construction.

Having thus described my invention, what I claim, and desire to secure by Letters Patent, is—

1. The propeller-wheel composed of a series of blades, $c$, constructed substantially as described, and provided with leading lips in advance of the attachment of the blade to the hub, substantially as and for the purpose specified.

2. The propeller-wheel composed of a series of blades, $c$, constructed substantially as described, and provided with leading lips in advance of the attachments of the blades to the hub, said blades being stayed at their extremities by a series of supplemental segmental blades corresponding in their arrangement to the segments of a screw-propeller, substantially as specified.

In testimony whereof I, the said ERWIN C. HUBBARD, have hereunto set my hand.

ERWIN C. HUBBARD.

Witnesses:
H. R. HUBBARD,
BENJ. B. LIPPINCOTT.